United States Patent
Nishide

(10) Patent No.: US 8,995,019 B2
(45) Date of Patent: Mar. 31, 2015

(54) IMAGE PROCESSING APPARATUS, IMAGE PROCESSING METHOD, AND NON-TRANSITORY COMPUTER READABLE MEDIUM

(71) Applicant: Fuji Xerox Co., Ltd., Minato-ku, Tokyo (JP)

(72) Inventor: Yasushi Nishide, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/894,838

(22) Filed: May 15, 2013

(65) Prior Publication Data

US 2014/0177002 A1    Jun. 26, 2014

(30) Foreign Application Priority Data

Dec. 26, 2012  (JP) ................................. 2012-282254

(51) Int. Cl.
| | |
|---|---|
| H04N 1/00 | (2006.01) |
| H04N 1/62 | (2006.01) |
| H04N 1/40 | (2006.01) |
| G06K 15/00 | (2006.01) |
| H04N 1/60 | (2006.01) |

(52) U.S. Cl.
CPC ...................................... H04N 1/60 (2013.01)
USPC ........ 358/3.01; 358/3.03; 358/3.02; 358/3.05

(58) Field of Classification Search
CPC ................ H04N 1/00244; H04N 1/62; H04N 2201/0046
See application file for complete search history.

(56) References Cited

U.S. PATENT DOCUMENTS

| | | | | |
|---|---|---|---|---|
| 2003/0095271 | A1* | 5/2003 | Falk ................................ | 358/1.9 |
| 2004/0080765 | A1* | 4/2004 | Nishide et al. ................. | 358/1.9 |
| 2005/0174588 | A1* | 8/2005 | Kodama et al. ................ | 358/1.9 |
| 2006/0232804 | A1* | 10/2006 | Furukawa ...................... | 358/1.9 |
| 2009/0074236 | A1* | 3/2009 | Kihara .......................... | 382/100 |

FOREIGN PATENT DOCUMENTS

| | | | |
|---|---|---|---|
| JP | 2008028917 | A  * | 2/2008 |
| JP | 4608837 | B2 | 1/2011 |

OTHER PUBLICATIONS

Matsuda, Hiroshi JP2008028917A Feb. 2008 Japan English Machine Language Translation.*

* cited by examiner

*Primary Examiner* — Marivelisse Santiago Cordero
*Assistant Examiner* — Daryl Jackson
(74) *Attorney, Agent, or Firm* — Sughrue Mion, PLLC

(57) ABSTRACT

An image processing apparatus includes an extracting unit extracting custom color identification data that identifies each of one or more custom colors different from multiple predetermined basic colors from drawing data for every page; a separation data generating unit generating separation data that indicates an object to be drawn for each color in accordance with the drawing data for one page without waiting for the completion of the extraction of the custom color identification data for the pages other than the one page; a raster data generating unit generating raster data concerning each color in accordance with the separation data; an acquiring unit acquiring mixing ratio data; and a combining unit combining the raster data concerning the custom color with the respective pieces of raster data concerning the basic colors in accordance with the mixing ratio data.

5 Claims, 7 Drawing Sheets

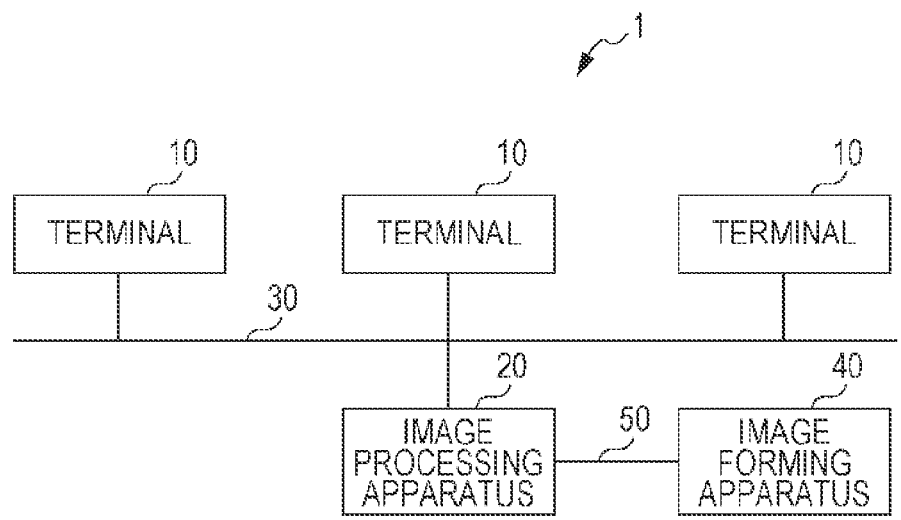
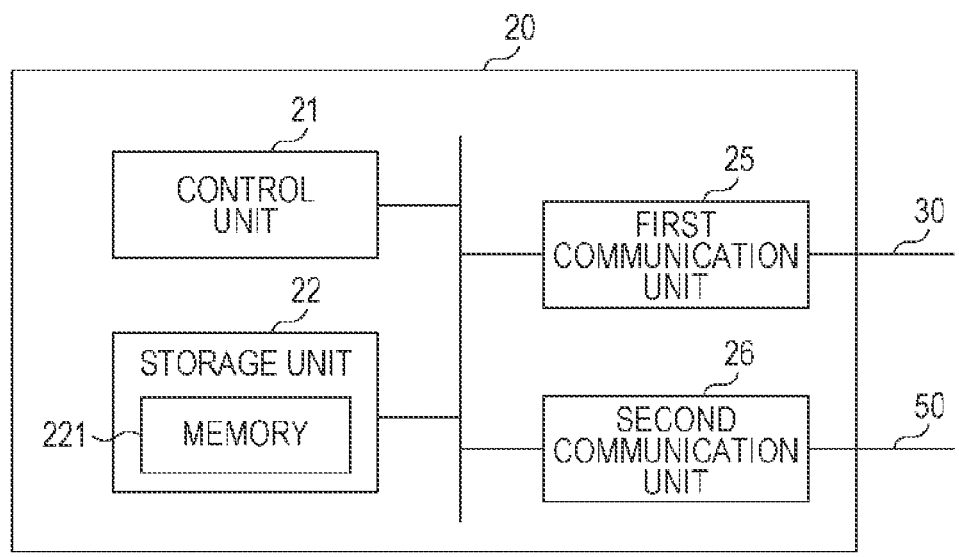

| PAGE | 1 | 2 | ... | N |
|---|---|---|---|---|
| CUSTOM COLOR NAME LIST | [(SPOT1)(SPOT2)] | [(SPOT2)] | ... | [(SPOT1)] |

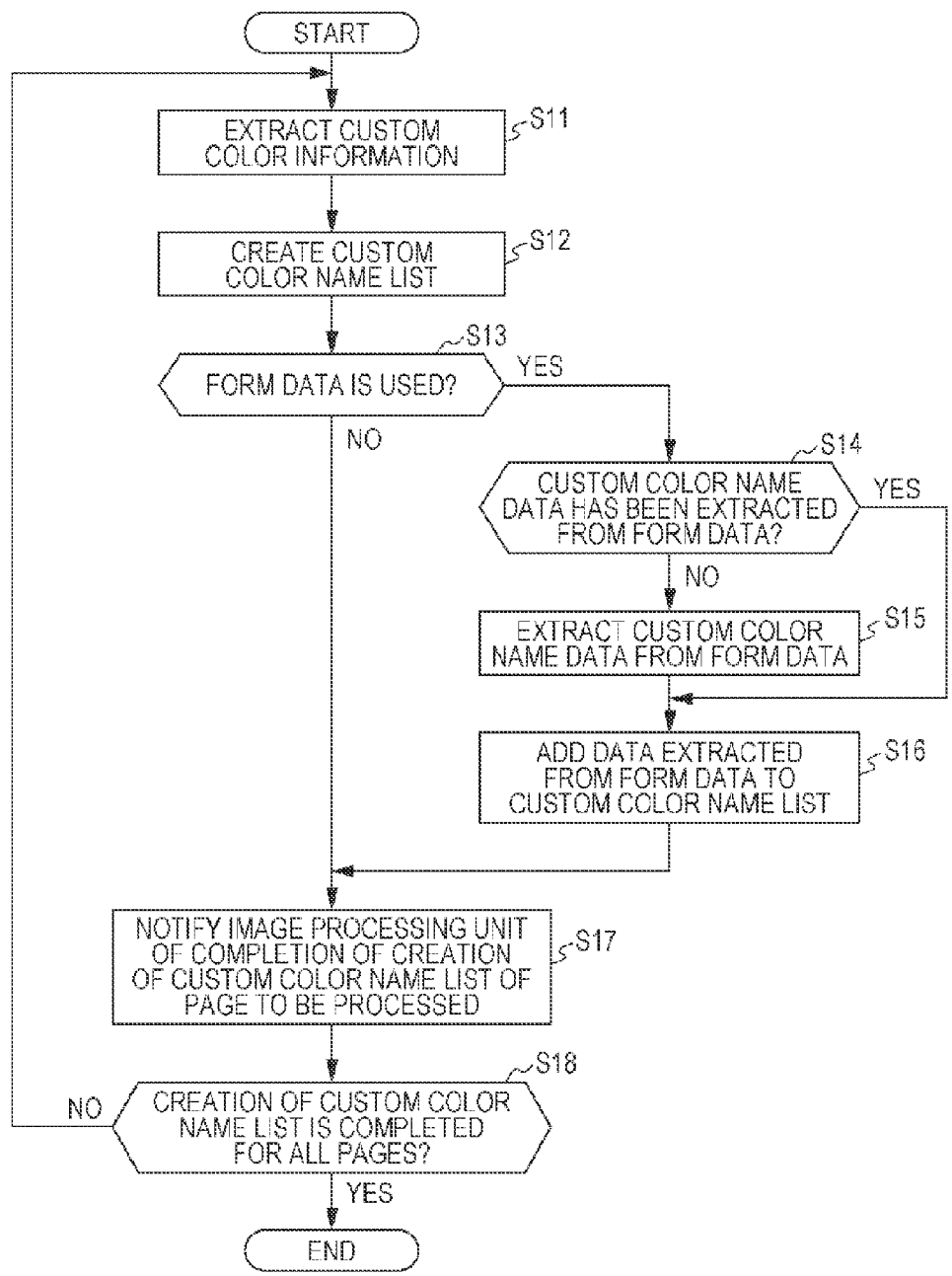

IMAGE PROCESSING APPARATUS, IMAGE PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-282254 filed Dec. 26, 2012.

BACKGROUND (i) Technical Field

The present invention relates to an image processing apparatus, an image processing method, and a non-transitory computer readable medium.

(ii) Related Art

Image forming apparatuses capable of forming color images of high quality each use, in addition to color materials (for example, toner or ink) of cyan (C), magenta (M), yellow (Y), and black (K) (these colors are hereinafter referred to as "basic colors), color materials of colors other than the basic colors (hereinafter referred to as "custom colors") to form an image on a recording medium, such as a sheet of paper. The image forming apparatuses using the color materials of the custom colors are hereinafter referred to as custom-color-supporting image forming apparatuses.

An image drawn by a user with, for example, an image editing application is stored in a computer, etc. as drawing data described in Page Description Language (PDL) (such drawing data is hereinafter referred to as PDL data). The PDL data includes an object to be drawn and data that specifies the color of the object. The PDL data is converted into separation data that indicates an element of each color material of the object by a separation process and, further, is converted into raster data that indicates a raster image of each color material by a raster image processor (RIP) process. The image forming apparatus performs overprinting using the respective color materials in accordance with the raster data for every color material to form one color image on the recording medium.

There are cases in which image forming apparatuses that form images by using the color materials of the basic colors (such image forming apparatuses are hereinafter referred to as "custom-color-no-supporting image forming apparatuses") are used to confirm whether the image formation is improperly performed due to, for example, incompatibility in interpretation of the PDL data in the custom-color-supporting image forming apparatuses. In such a case, if the separation process and the RIP process are performed after a custom color specified for an object in the PDL data is converted into the basic colors in accordance with a predetermined mixing ratio and, then, is combined, an image formed in accordance with the raster data that is generated is not necessarily capable of accurately emulating an image formed by the custom-color-supporting image forming apparatus in an overprint area of overprinting, trapping, or the like. Accordingly, it is necessary to follow a procedure in which, after the separation data and the raster data of the respective colors including the custom colors are generated from the PDL data, the data resulting from conversion of the raster data of the custom colors in accordance with a predetermined mixing ratio is combined with the raster data of the basic colors.

SUMMARY

According to an aspect of the invention, there is provided an image processing apparatus including an extracting unit that extracts custom color identification data that identifies each of one or more custom colors different from a plurality of predetermined basic colors from drawing data that is described in a page description language and that instructs drawing of a plurality of pages for every page; a separation data generating unit that, each time the extracting unit completes the extraction of the custom color identification data for one page in the plurality of pages, generates separation data that indicates an object to be drawn for each of the basic colors and the custom color identified by the custom color identification data extracted for the one page by the extracting unit in accordance with the drawing data for the one page without waiting for the completion of the extraction of the custom color identification data for the pages other than the one page; a raster data generating unit that generates raster data concerning each of the basic colors and the custom color in accordance with the separation data concerning each of the basic colors and the custom color generated by the separation data generating unit; an acquiring unit that acquires mixing ratio data indicating a ratio of mixture when the custom color identified by the custom color identification data extracted by the extracting unit is represented by the mixture with the basic colors; and a combining unit that combines the raster data generated for the custom color by the raster data generating unit with the respective pieces of raster data generated for the basic colors by the raster data generating unit in accordance with the mixing ratio data acquired by the acquiring unit.

BRIEF DESCRIPTION OF THE DRAWINGS

Exemplary embodiments of the present invention will be described in detail based on the following figures, wherein:

FIG. 1 is a block diagram illustrating an exemplary configuration of a system according to an exemplary embodiment of the present invention;

FIG. 2 is a block diagram illustrating an exemplary hardware configuration of an image processing apparatus;

FIG. 7 is a flowchart illustrating the process performed by the image processing apparatus according to the exemplary embodiment in detail;

DETAILED DESCRIPTION

<Configuration>

Figure 3:
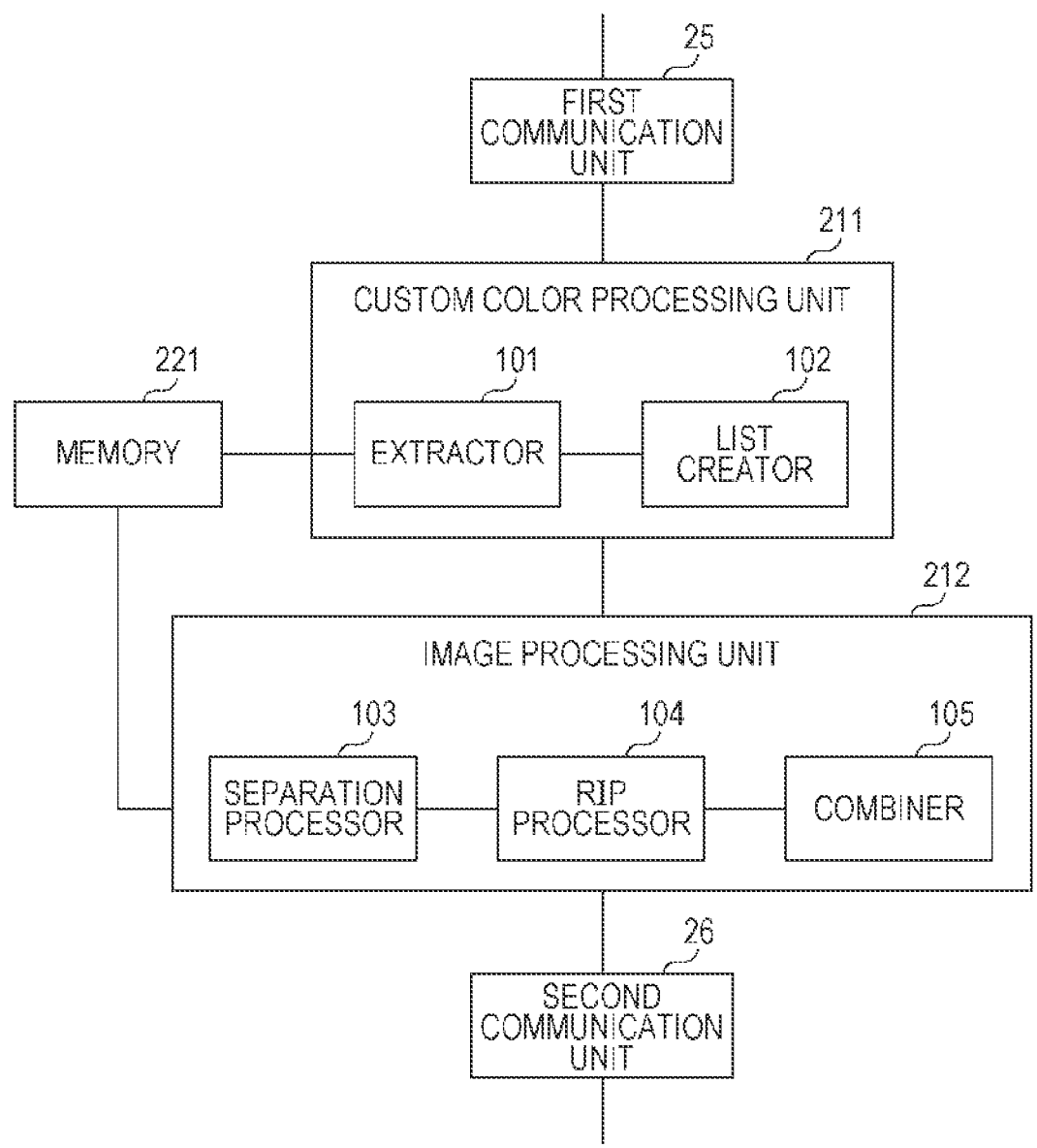
FIG. 3 illustrates an exemplary functional configuration of the image processing apparatus.

FIG. 1 is a block diagram illustrating an exemplary configuration of a system 1 according to an exemplary embodiment of the present invention. Referring to FIG. 1, in the system 1, multiple terminals 10 and an image processing apparatus 20 are connected to each other via a communication network 30, such as a local area network (LAN), and the image processing apparatus 20 is connected to an image forming apparatus 40 via a communication network 50, such as an LAN. Each of the terminals 10 is, for example, a personal computer. The terminal 10 performs image processing including generation, processing, and editing of images in accordance with various applications to generate PDL data and transmits the generated PDL data to the image processing apparatus 20. Although it is assumed in the following description that the data specifying the basic colors included in the PDL data generated by the terminal 10 is in a CMYK format, the data may be in an RGB format or may include a combination of data of the CMYK format and data of the RGB format.

The image processing apparatus 20 is, for example, a so-called print server. The image processing apparatus 20 receives the PDL data (including specification of a custom color) from the terminals 10 and performs the separation process (a separation data generating process) and the RIP process (a raster data generation process). After the image processing apparatus 20 separates the generated raster data of the custom color into the basic colors in accordance with a predetermined mixing ratio corresponding to the custom color, the image processing apparatus 20 combines the data resulting from the separation with the raster data of the basic colors. The image processing apparatus 20 transmits the raster data of the basic colors, which results from the combination, to the image forming apparatus 40.

The image forming apparatus 40 is the custom-color-no-supporting image forming apparatus that forms a color image with the toner of the basic colors on a recording medium, such as a sheet of paper, according to an electrophotographic system. The image forming apparatus 40 forms a toner image of each basic color on the basis of the raster data transmitted from the image processing apparatus 20, transfers the formed toner image on the recording medium, and fixes the toner image on the recording medium to form an image on the recording medium. Although one image forming apparatus 40 is connected to the image processing apparatus 20 in the example in FIG. 1, multiple image forming apparatuses 40 may be connected to the image processing apparatus 20.

FIG. 2 is a block diagram illustrating an exemplary hardware configuration of the image processing apparatus 20. Referring to FIG. 2, a control unit 21 in the image processing apparatus 20 includes a processor such as a central processing unit (CPU), a read only memory (ROM), and a random access memory (RAM). Programs, such as a multi-task operating system (OS) program, executed by the processor are stored in the ROM. In response to execution of the programs by the processor, an image processing function is realized to perform the image processing (the separation process, the RIP process, etc.) for the PDL data received from the terminals 10.

A first communication unit 25 in the image processing apparatus 20 has a communication interface function to communicate with each of the terminals 10. The first communication unit 25 receives the PDL data transmitted from terminal 10 and supplies the received PDL data to the control unit 21. A storage unit 22 in the image processing apparatus 20 includes a memory 221 and stores a variety of data including the PDL data supplied to the control unit 21. A second communication unit 26 in the image processing apparatus 20 has a communication interface function to communicate with the image forming apparatus 40. The second communication unit 26 transmits the raster data supplied from the control unit 21 to the image forming apparatus 40.

The functional configuration of the image processing apparatus 20 will now be described with reference to FIG. 3. FIG. 3 illustrates an example of the functional configuration of the image processing apparatus 20. Referring to FIG. 3, a custom color processing unit 211 and an image processing unit 212 are realized by the control unit 21 that reads out the computer programs stored in the ROM or the storage unit 22 to execute the computer programs. In the present exemplary embodiment, each component illustrated in FIG. 3 operates on a multi-task OS and multiple tasks (processes) may operate in parallel on the multi-task OS.

The custom color processing unit 211 includes an extractor 101 and a list creator 102. The extractor 101 extracts custom color name data (custom color identification data) indicating each custom color name from the PDL data transmitted from each of the terminals 10 for every page. In addition, the extractor 101 acquires mixing ratio data indicating the mixing ratio of the basic colors for pseudo-reproduction of the custom color identified by each custom color name indicated by the extracted custom color name data by mixture of the basic colors. The mixing ratio data corresponding to the extracted custom color name data may be stored in the memory 221. In this case, the extractor 101 reads out the mixing ratio data corresponding to the custom color name data from the memory 221 to acquire the mixing ratio data. The mixing ratio data corresponding to the extracted custom color name data may be included in the PDL data. In this case, the extractor 101 extracts the mixing ratio data corresponding to the custom color name data from the PDL data to acquire the mixing ratio data.

The extractor 101 temporarily stores the custom color name data extracted in the above manner and the mixing ratio data acquired in the above manner in a working space of the memory 221. The extractor 101 is an example of an extracting unit of the present invention and is also an example of an acquiring unit of the present invention.

The custom color name data included in the PDL data and the mixing ratio data may have various formats. For example, the custom color name data may be included in the PDL data in the following comment format:

"%%DocumentcustomColors:
%%+(SPOT 1)
%%+(SPOT 2)
%%CMYKCustomColor: 0 0.160004 0.169998 0 (SPOT 1)
%%CMYKCustomColor: 0.330002 0.899994 0.0299988 0 (SPOT 2)"

The above comment indicates that two custom colors identified by custom color names "(SPOT 1)" and "(SPOT 2)" are specified in the PDL data (or on a page corresponding to the PDL data). The extractor 101 extracts "(SPOT 1)" and "(SPOT 2)" from the comment as the custom color name data.

The above comment also indicates that the mixing ratio of the basic colors for the pseudo-reproduction of the custom color identified by the custom color name "(SPOT 1)" is "0 0.160004 0.169998 0" (in the order of C, M, Y, and K and the same applies to the following description) and the mixing ratio of the basic colors for the pseudo-reproduction of the custom color identified by the custom color name "(SPOT 2)" is "0.330002 0.899994 0.0299988 0." The extractor 101 extracts "0 0.160004 0.169998 0" and "0.330002 0.899994 0.0299988 0" from the comment as the pieces of mixing ratio data corresponding to the respective pieces of custom color name data.

There are cases in which no comment is included in the PDL data and the custom color name data and the mixing ratio data are included in the code of the PDL data. In such a case, the extractor 101 analyzes the code of the PDL data to extract the above data. Specifically, for example, in the PDL data for composite output, the custom color name and the mixing ratio are generally specified in a format "[0 0.16 0.17 0 (SPOT)] 1 setcustomcolor." The extractor 101 extracts the custom color name data "(SPOT)" and the mixing ratio data "0 0.16 0.17 0" from this description.

Some applications specify each custom color in a format "[/Separation (SPOT 1)/DeviceGray ( )] setcolorspace." In this case, the extractor 101 extracts "(SPOT 1)" as the custom color name data and re-defines the setcolorspace operator to acquire the mixing ratio data from an array of arguments. Not only the custom color but also the basic colors (cyan, magenta, yellow, and black) and special version names (All, None) defined in a drawing instruction may be specified in the setcolorspace operator. The extractor 101 does not perform, for example, the extraction of the custom color name data for the setcolorspace operator for which the above version names are specified.

Each time the extractor 101 finishes the extraction of the custom color name data for one page and the acquisition of the mixing ratio data (these processes are collectively hereinafter referred to as an "extraction process"), the list creator 102 creates a list of the pieces of custom color name data for the one page (hereinafter referred to as a "custom color name list") extracted by the extractor 101 without waiting for completion of the extraction process of the remaining pages.

The PDL data may include form data (template data) instructing drawing of an object commonly used in multiple pages. The form data represents a portion where a common image is drawn in so-called variable printing (printing of a document composed of the portion where an image common to multiple documents or multiple pages is drawn and a portion where an image specific to each document or each page is drawn.

In the PDL data, the form data is included in a page where an object that is commonly used first appears while use of the form data is instructed but no form data is included in the subsequent pages. Accordingly, it is not possible to extract, for example, the custom color name data used in the form data from the PDL data for the subsequent pages. Specifically, for example, it is assumed that the custom color identified by the custom color name "(SPOT 1)" is specified for an object commonly used in multiple pages in the form data. It is also assumed that the custom color identified by the custom color name "(SPOT 2)" is specified for an object that is not commonly used in the PDL data (the code other than the form data) on a page for which the use of the form data is instructed. When the page is not the page where the common object is first drawn, the code specifying the custom color name "(SPOT 1)" is not included in the code of the page and, thus, the custom color name "(SPOT 2)" is extracted but the custom color name "(SPOT 1)" is not extracted. Accordingly, for the page for which the use of the form data is specified, the list creator 102 includes the custom color name data that has been extracted from the form data by the extractor 101 for the pages previous to the page in the custom color name list of the page to prevent the custom color name data from not being extracted.

Figures 4, 5:
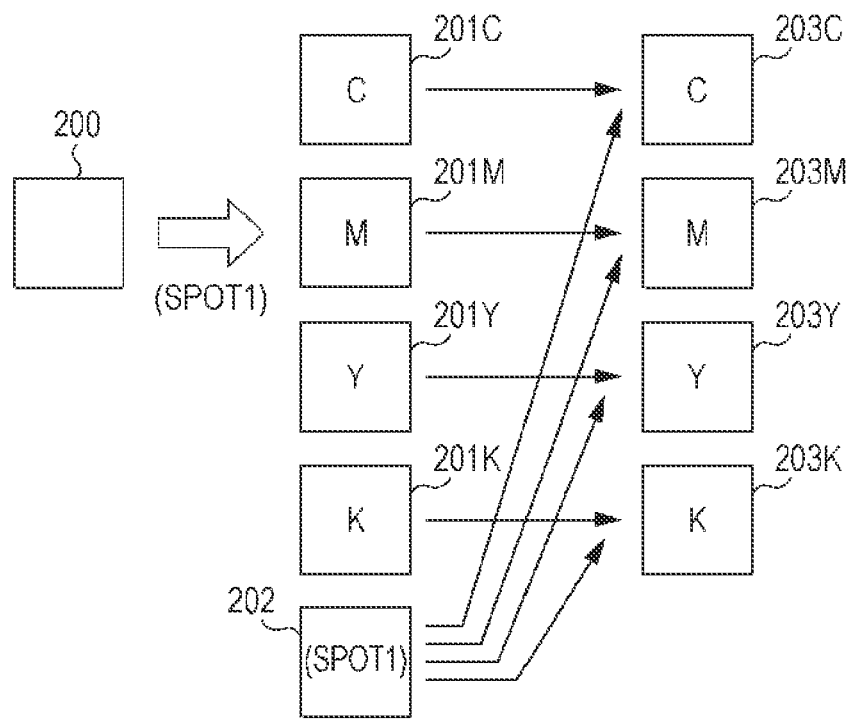
FIG. 4 illustrates an example of the content of a custom color name list.
FIG. 5 is a diagram for describing a combining process.

The list creator 102 creates the custom color name list of each page by the above process. FIG. 4 illustrates an example of the content of the custom color name list created by the list creator 102. For a page for which no custom color is used, the list creator 102 does not create the custom color name list or creates an empty custom color name list.

The image processing unit 212 includes a separation processor 103 (an example of a separation data generating unit), a RIP processor 104 (an example of a raster data generating unit), and a combiner 105. The separation processor 103 separates an object indicated by the PDL data transmitted from the terminal 10 into elements corresponding to the respective basic colors and the respective custom colors indicated in the custom color name list for every page.

Upon completion of the creation of the custom color name list of each page, the list creator 102 notifies the separation processor 103 of the completion of the creation of the custom color name list. Each time the separation processor 103 is notified of the completion of the creation of the custom color name list from the list creator 102, the separation processor 103 starts the separation process for the page. Specifically, while the separation processor 103 is performing the separation process for a certain page, the list creator 102 performs in parallel the creation of the custom color name list for the pages subsequent to the page. In other words, each time the list creator 102 finishes the creation of the custom color name list of a certain page, the separation processor 103 generates the separation data concerning each of the basic colors and each of the custom colors included in the custom color name list from the PDL data for one page without waiting for the completion of the creation of the custom color name list of the remaining pages.

The RIP processor 104 generates the raster data from the separation data generated for every color by the separation processor 103. Each time the RIP processor 104 finishes the generation of the raster data corresponding to one page, the combiner 105 separates the raster data concerning the custom color generated by the RIP processor 104 into the elements of the respective basic colors in accordance with the mixing ratio data acquired by the extractor 101 and, then, combines the elements resulting from the separation with the pieces of raster data concerning the respective basic colors generated by the RIP processor 104.

An example of the combination of the raster data generated from the raster data concerning a custom color with the pieces of raster data concerning the basic colors, performed by the image processing unit 212, will now be described with reference to FIG. 5. In the example in FIG. 5, "(SPOT 1)" is extracted as the custom color name data. The image processing unit 212 performs the separation process by using PDL data 200 to generate the separation data concerning each of the basic colors and the custom color "(SPOT 1)." Then, the image processing unit 212 performs the RIP process by using the separation data concerning each color generated in the separation process to generate pieces of raster data 201C, 201M, 201Y, and 201K concerning the basic colors: cyan, magenta, yellow, and black and raster data 202 concerning the custom color "(SPOT 1)."

Then, the image processing unit 212 adds a value resulting from multiplication of the value of each pixel indicated by the raster data 202 concerning the custom color "(SPOT 1)" by a ratio corresponding to the basic colors: cyan, magenta, yellow, and black, indicated by the mixing ratio data concerning the custom color "(SPOT 1)", to the value of each of the pixels indicated by the pieces of raster data 201C, 201M, 201Y, and 201K to perform the combination of the pieces of raster data concerning the basic colors. As a result, pieces of raster data 203C, 203M, 203Y, and 203K concerning the basic colors: cyan, magenta, yellow, and black including the elements for the pseudo-drawing of the object of the custom color with the basic colors are generated.

In order to more appropriate color reproduction, the image processing unit 212 may include a color management system (hereinafter referred to as a CMS) of a general configuration, which performs color correction for the raster data concerning each color. In this case, for example, the storage unit 22 may store a look-up table (hereinafter referred to as an LUT) used by the CMS for the color correction and the CMS in the image processing unit 212 may perform the color correction for the raster data concerning each color while referring to the LUT stored in the storage unit 22.

The raster data generated by the combiner 105 (when the image processing unit 212 includes the CMS, the raster data resulting from the color correction by the CMS for the raster data generated by the combiner 105) is transmitted to the image forming apparatus 40 from the image processing unit 212. The image forming apparatus 40 forms an image on the recording medium in accordance with the raster data transmitted from the image processing apparatus 20.

<Operation>

Figure 6:
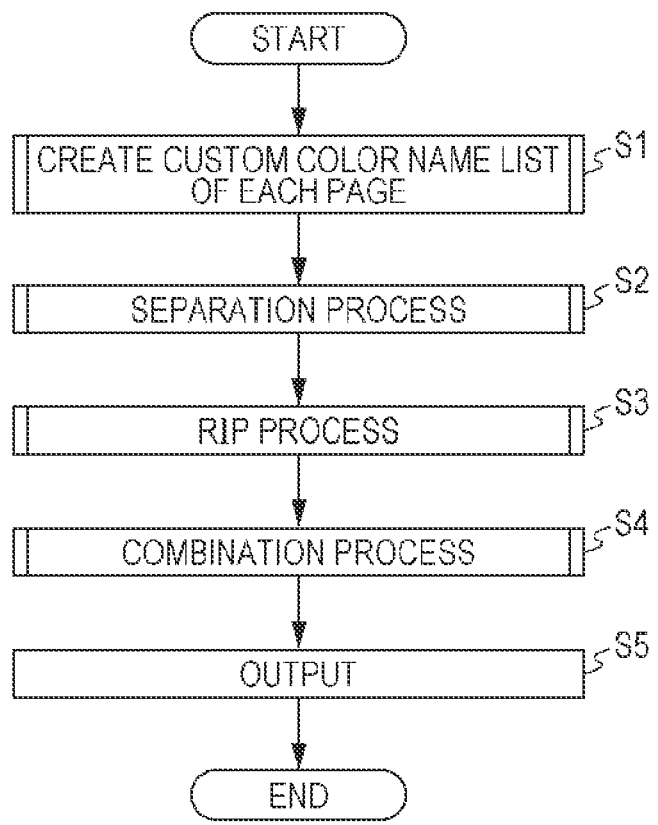
FIG. 6 is a flowchart illustrating a process performed by the image processing apparatus according to an exemplary embodiment.

An exemplary process performed by the image processing apparatus 20 will now be described with reference to FIG. 6. The control unit 21 in the image processing apparatus 20 starts the process illustrated in FIG. 6 upon reception of the PDL data from the terminal 10 via the first communication unit 25. Referring to FIG. 6, in Step S1, the control unit 21 extracts the custom color name data from the PDL data for every page to create the custom color name list.

The creation of the custom color name list in Step S1 in FIG. 6 will now be described in detail with reference to FIG. 7. Referring to FIG. 7, in Step S11, the extractor 101 in the custom color processing unit 211 extracts the custom color name data from the PDL data for a page to be processed and passes the custom color name data to the list creator 102. In Step S12, the list creator 102 newly creates the custom color name list of the page to be processed in the storage unit 22 and adds the custom color name data passed from the extractor 101 to the custom color name list that is newly created.

In Step S13, the custom color processing unit 211 analyzes the code in the PDL data to determine whether the form data is used on the page to be processed. If the custom color processing unit 211 determines that the form data is not used on the page to be processed (NO in Step S13), the custom color processing unit 211 completes the creation of the custom color name list of the page to be processed. The process goes to Step S17.

If the custom color processing unit 211 determines that the form data is used on the page to be processed (YES in Step S13), in Step S14, the custom color processing unit 211 determines whether the custom color name data has been extracted from the form data used on the page to be processed. If the form data is first used on the page to be processed, the extraction of the custom color name data from the form data is not performed and the determination in Step S14 is negative (NO). In this case, in Step S15, the extractor 101 extracts the custom color name data from the form data and passes the custom color name data to the list creator 102. In Step S16, the list creator 102 adds the custom color name data that is passed to the custom color name list created in Step S12. Then, the process goes to Step S17.

If the form data determined to be used in Step S13 is also used in any page previous to the page to be processed, the custom color name data has been extracted from the form data in Step S15, which has been performed for the page, and the determination in Step S14 is affirmative (YES). In this case, the process skips Step S15. In Step S16, the list creator 102 adds the custom color name data passed from the extractor 101 in Step S15 that has been previously performed (the custom color name data extracted from the form data) to the custom color name list created in Step S12. Then, the process goes to Step S17.

In Step S17, the custom color processing unit 211 notifies the image processing unit 212 of the completion of the creation of the custom color name list of the page to be processed. In Step S18, the custom color processing unit 211 determines whether the creation of the custom color name list is completed for all the pages. If the next page remains (NO in Step S18), the process goes back to Step S11 to repeat Steps S11 to S18 for the next page. The custom color processing unit 211 creates the custom color name list for the next page and notifies the image processing unit 212 of the completion of the creation of the custom color name list for the next page. If the custom color processing unit 211 determines that the creation of the custom color name list is completed for all the pages (YES in Step S18), the process in FIG. 7 is terminated.

Referring back to FIG. 6, upon reception of the notification of the completion of the creation of the custom color name list for every page from the custom color processing unit 211 in Step S17, in Step S2, the separation processor 103 in the image processing unit 212 reads out the custom color name list of the page for which the creation of the custom color name list is completed (the page to be processed) from the memory 221 and performs the separation process in accordance with the PDL data on the page to be processed to generate the separation data concerning each of the basic colors and the custom colors (for example, the custom color "(SPOT 1)" and the custom color "(SPOT 2)") indicated by the custom color name data included in the custom color name list.

In Step S3, the RIP processor 104 performs the RIP process in accordance with the separation data concerning each of the basic colors and the custom colors to generate the raster data concerning each of the basic colors and the custom colors.

In Step S4, the combiner 105 combines the raster data concerning each of the custom colors indicated by the custom color name data included in the custom color name list with the pieces of raster data concerning the basic colors: cyan, magenta, yellow, and black in accordance with the mixing ratio data concerning the custom color to generate the pieces raster data concerning the basic colors: cyan, magenta, yellow, and black including the pseudo-drawing of the object of the custom color.

In Step S5, the image processing unit 212 transmits the pieces of raster data concerning the basic colors to the image forming apparatus 40. The image processing unit 212 repeats Steps S2 to S5 each time the image processing unit 212 sequentially receives the notification of the completion of the creation of the custom color name list from the custom color processing unit 211 for the respective multiple pages for which the drawing is instructed by the PDL data. Accordingly, the image processing unit 212 starts the processing in Steps S2 to S5 by using the notification of the completion of the creation of the custom color name list of each page from the custom color processing unit 211 as a trigger. In contrast, after the custom color processing unit 211 notifies the image processing unit 212 of the completion of the creation of the custom color name list of a certain page, the custom color processing unit 211 starts the series of processing, that is, Steps S11 to S17 for the creation of the custom color name list of the next page, without waiting for the completion of Steps S2 to S5 by the image processing unit 212.

Figure 8A:
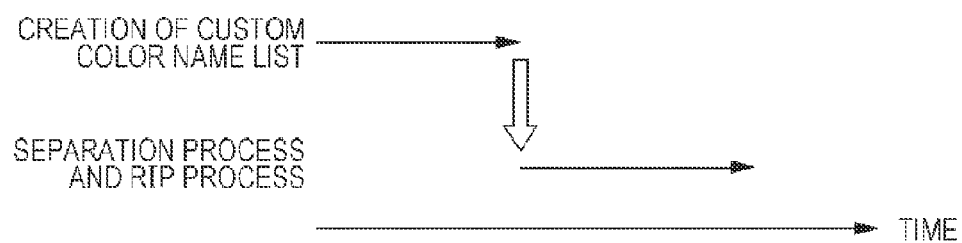
FIG. 8A is a diagram for describing the timing when a process of creating the custom color name list is performed and the timing when a separation process and a RIP process are performed.
Figure 8B:
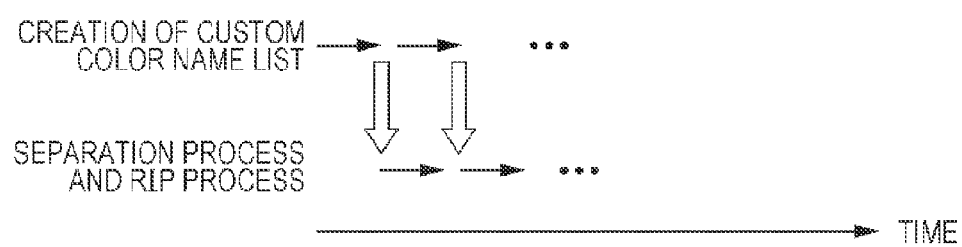
FIG. 8B is another diagram for describing the timing when the process of creating the custom color name list is performed and the timing when the separation process and the RIP process are performed.

In an apparatus in the related art, as illustrated in FIG. 8A, the separation process and the RIP process are performed after the creation of the custom color name list is performed for all the pages. In contrast, in the present exemplary embodiment, as illustrated in FIG. 8B, the creation of the custom color name list is performed for every page and the separation process and the RIP process of the page for which the custom color name list has been created are performed in parallel with the creation of the custom color name list of another page. Accordingly, the processing speed is increased, compared with the case in which the separation process is performed after the completion of the creation of the custom color name list for all the pages is waited for.

In addition, in the present exemplary embodiment, if the specification of the form data is included in the PDL data, the custom color name data extracted for the first page for which the form data is included is added to the custom color name list of the subsequent page that includes the form data. As a result, the custom color name data on the subsequent page, included in the form data, is prevented from being excluded from the custom color name list of the page.

Furthermore, when a technique in the related art is adopted in which, after the separation data is generated by using temporary custom color names of a predetermined number, the temporary custom color names are replaced with the custom color names that have been actually identified, an error may possibly occur in the creation of the separation data or the series of processing to increase the number of the pieces of separation data may possibly be stopped if the custom colors of a number exceeding the predetermined number is determined to be used in the generation of the separation data. In contrast, in the present exemplary embodiment, since the custom color name data is extracted for every page and the generation of the separation data is started after the number of colors to be separated is identified, the disadvantages that may occur in the technique in the related art do not occur.

<Modifications>

While the invention is described in terms of some specific exemplary embodiments, it will be clear that this invention is not limited to these specific exemplary embodiments and that many changes and modifications will be obvious to those skilled in the art. Exemplary modifications will now be described. A combination of the modifications may be adopted.

(1) Although the apparatus adopting the electrophotographic system is used as the image forming apparatus 40 in the above exemplary embodiments, an apparatus that forms an image by another method, such as an ink jet method, may be used.

Figure 9:
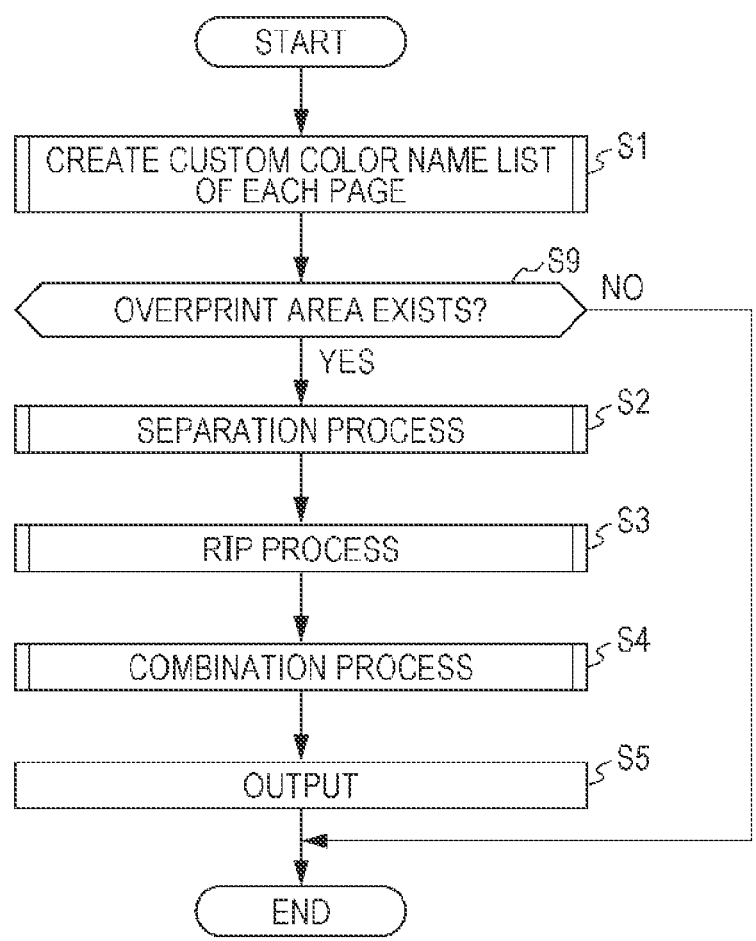
FIG. 9 is a flowchart illustrating a process performed by the image processing apparatus according to a modification.

(2) The configuration in which the raster data is transmitted to the image forming apparatus 40 regardless of whether the overprint area exists between each basic color and each custom color or between the custom colors on a page to be processed is adopted in the above exemplary embodiments. When the transmission of the raster data to the image forming apparatus 40 is intended for proof print to check whether an error occurs in the overprint area between each basic color and each custom color or between the custom colors in an image formed in accordance with the PDL data in the custom-color-supporting image forming apparatus, it is not necessary to perform the proof print for a page in which no overprint area exists between each basic color and each custom color and between the custom colors and, thus, it is not necessary to perform the separation process and the subsequent processes for the page. Accordingly, the process illustrated in FIG. 6 may be modified into a process illustrated in FIG. 9. Referring to FIG. 9, upon completion of the creation of the custom color name list for every page (Step S1), in Step S9, the custom color processing unit 211 determines whether the overprint area exists between each basic color and each custom color or between the custom colors on a page to be processed. If the custom color processing unit 211 determines that the overprint area exists between each basic color and each custom color or between the custom colors on the page to be processed (YES in Step S9), the process goes to Step S2. If the custom color processing unit 211 determines that no overprint area exists between each basic color and each custom color and between the custom colors on the page to be processed (NO in Step S9), the process skips Step S2 and the subsequent steps. As a result, the separation process and so on are not performed for a page for which the proof print is not necessary and the entire processing speed is increased, compared with the case following the flowchart illustrated in FIG. 6.

(3) Although the image processing apparatus 20 is separated from the image forming apparatus 40 in the above exemplary embodiments, the image processing apparatus 20 may be integrated with the image forming apparatus 40. Alternatively, the image processing apparatus 20 may be integrated with the terminal 10 in the above exemplary embodiments. Alternatively, the function of the image processing apparatus 20 according to the above exemplary embodiments may be shared between multiple apparatuses connected to each other via a communication network, such as the LAN.

(4) Although the control unit 21 executes the programs stored in the ROM to perform the various processes including the creation of the custom color name list, the separation process, and the RIP process in the above exemplary embodiments, the configuration to perform the processes according to the above exemplary embodiments is not limited to the above one. For example, the image processing apparatus 20 may include a hardware apparatus, such as a digital signal processor (DSP), which performs the above processes, and the hardware apparatus may perform the above processes. Alternatively, the processes according to the above exemplary embodiments may be shared between the hardware apparatus and the control unit 21.

The programs stored in the ROM or the storage unit 22 may be supplied in a state in which the programs are stored in a computer-readable recording medium, such as a magnetic recording medium (for example, a magnetic tape, a magnetic disk (a hard disk drive (HDD)), or a flexible disk (FD)), an optical recording medium (for example, an optical disk), a magneto-optical recording medium, or a semiconductor memory. Alternatively, the programs stored in the ROM or the storage unit 22 may be downloaded into the image processing apparatus 20 via a communication line, such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   an extracting unit that extracts custom color identification data that identifies each of one or more custom colors different from a plurality of predetermined basic colors from drawing data that is described in a page description language and that instructs drawing of a plurality of pages for every page;
   a separation data generating unit that, each time the extracting unit completes the extraction of the custom color identification data for one page in the plurality of pages, generates separation data that indicates an object to be drawn for each of the basic colors and the custom color identified by the custom color identification data extracted for the one page by the extracting unit in accordance with the drawing data for the one page without waiting for the completion of the extraction of the custom color identification data for the pages other than the one page;

a raster data generating unit that generates raster data concerning each of the basic colors and the custom color in accordance with the separation data concerning each of the basic colors and the custom color generated by the separation data generating unit;

an acquiring unit that acquires mixing ratio data indicating a ratio of mixture when the custom color identified by the custom color identification data extracted by the extracting unit is represented by the mixture with the basic colors; and a combining unit that combines the raster data generated for the custom color by the raster data generating unit with the respective pieces of raster data generated for the basic colors by the raster data generating unit in accordance with the mixing ratio data acquired by the acquiring unit, wherein, in response to form data indicating drawing of an object that is shared between two or more pages in the plurality of pages being included in the drawing data and the extraction of the custom color identification data from the form data being performed by the extracting unit for one page in the plurality of pages, the extracting unit does not extract the custom color identification data from the form data for the pages other than the one page and the separation data generating unit generates the separation data concerning the custom color identified by the custom color identification data extracted for the one page by the extracting unit for the pages other than the one page.

2. The image processing apparatus according to claim 1, wherein, in response to no overprint area existing between the object of the custom color indicated by the drawing data and another object of the basic colors or the custom color for one page in the plurality of pages, the separation data generating unit does not generate the separation data of the custom color for the one page.

3. The image processing apparatus according to claim 1, wherein, in response to no overprint area existing between the object of the custom color indicated by the drawing data and another object of the basic colors or the custom color for one page in the plurality of pages, the separation data generating unit does not generate the separation data of the custom color for the one page.

4. A non-transitory computer readable medium storing a program causing a computer to execute a process comprising:

extracting custom color identification data that identifies each of one or more custom colors different from a plurality of predetermined basic colors from drawing data that is described in a page description language and that instructs drawing of a plurality of pages for every page;

generating, each time the extraction of the custom color identification data for one page in the plurality of pages is completed, separation data that indicates an object to be drawn for each of the basic colors and the custom color identified by the custom color identification data extracted for the one page in accordance with the drawing data for the one page without waiting for the completion of the extraction of the custom color identification data for the pages other than the one page;

generating raster data concerning each of the basic colors and the custom color in accordance with the separation data concerning each of the basic colors and the custom color that is generated;

acquiring mixing ratio data indicating a ratio of mixture when the custom color identified by the custom color identification data that is extracted is represented by the mixture with the basic colors; and combining the raster data generated for the custom color with the respective pieces of raster data generated for the basic colors in accordance with the mixing ratio data that is acquired, wherein in response to form data indicating drawing of an object that is shared between two or more pages in the plurality of pages being included in the drawing data and the extraction of the custom color identification data from the form data being performed for one page in the plurality of pages, the custom color identification data is not extracted from the form data for the pages other than the one page and the separation data is generated to concern the custom color identified by the custom color identification data extracted for the one page for the pages other than the one page.

5. An image processing method comprising:

extracting custom color identification data that identifies each of one or more custom colors different from a plurality of predetermined basic colors from drawing data that is described in a page description language and that instructs drawing of a plurality of pages for every page;

generating, each time the extraction of the custom color identification data for one page in the plurality of pages is completed, separation data that indicates an object to be drawn for each of the basic colors and the custom color identified by the custom color identification data extracted for the one page in accordance with the drawing data for the one page without waiting for the completion of the extraction of the custom color identification data for the pages other than the one page;

generating raster data concerning each of the basic colors and the custom color in accordance with the separation data concerning each of the basic colors and the custom color that is generated;

acquiring mixing ratio data indicating a ratio of mixture when the custom color identified by the custom color identification data that is extracted is represented by the mixture with the basic colors; and combining the raster data generated for the custom color with the respective pieces of raster data generated for the basic colors in accordance with the mixing ratio data that is acquired, wherein in response to form data indicating drawing of an object that is shared between two or more pages in the plurality of pages being included in the drawing data and the extraction of the custom color identification data from the form data being performed for one page in the plurality of pages, the custom color identification data is not extracted from the form data for the pages other than the one page and the separation data is generated to concern the custom color identified by the custom color identification data extracted for the one page for the pages other than the one page.

* * * * *